(12) United States Patent
Asada et al.

(10) Patent No.: US 7,862,238 B2
(45) Date of Patent: Jan. 4, 2011

(54) HYDRODYNAMIC BEARING ROTARY DEVICE AND INFORMATION APPARATUS

(75) Inventors: Takafumi Asada, Osaka (JP); Hiroaki Saito, Ehime (JP); Daisuke Itou, Osaka (JP); Keigo Kusaka, Ehime (JP); Hiroyuki Kiriyama, Ehime (JP)

(73) Assignee: Panasonic Corporation, Osaka (JP)

( * ) Notice: Subject to any disclaimer, the term of this patent is extended or adjusted under 35 U.S.C. 154(b) by 887 days.

(21) Appl. No.: 11/730,144

(22) Filed: Mar. 29, 2007

(65) Prior Publication Data
US 2007/0230840 A1 Oct. 4, 2007

(30) Foreign Application Priority Data
Mar. 31, 2006 (JP) .............................. 2006-098846

(51) Int. Cl.
F16C 32/06 (2006.01)
F16C 17/10 (2006.01)
(52) U.S. Cl. ..................... 384/107; 384/115; 384/123
(58) Field of Classification Search .................. 384/100, 384/107, 110, 112, 114–115, 123; 310/90; 360/99.07, 99.08
See application file for complete search history.

(56) References Cited

U.S. PATENT DOCUMENTS

| | | | |
|---|---|---|---|
| 6,836,388 B2* | 12/2004 | Nishimura et al. | 360/99.08 |
| 6,980,394 B2* | 12/2005 | Inoue et al. | 384/112 |
| 7,092,203 B2* | 8/2006 | Inoue et al. | 384/107 |
| 7,105,970 B2* | 9/2006 | Yajima et al. | 310/156.45 |
| 7,153,028 B2* | 12/2006 | Oelsch | 384/100 |
| 7,210,850 B2* | 5/2007 | Kusaka et al. | 384/107 |
| 7,391,139 B2* | 6/2008 | Yamamoto | 384/107 |
| 7,525,226 B2* | 4/2009 | Kodama | 310/90 |
| 7,556,433 B2* | 7/2009 | Kurimura et al. | 384/100 |
| 2004/0223673 A1* | 11/2004 | Tiller et al. | 384/107 |
| 2005/0084189 A1* | 4/2005 | Oelsch | 384/107 |
| 2006/0018576 A1 | 1/2006 | Kusaka et al. | |
| 2006/0029312 A1* | 2/2006 | Kiriyama et al. | 384/107 |

FOREIGN PATENT DOCUMENTS

JP 58-19414 A * 2/1983
JP 59-19414 A * 2/1983

(Continued)

*Primary Examiner*—Marcus Charles
(74) *Attorney, Agent, or Firm*—Wenderoth, Lind & Ponack, L.L.P.

(57) ABSTRACT

A hydrodynamic bearing rotary device which can reduce rotation friction, and recording and reproducing apparatus including the same is provided. In the hydrodynamic bearing rotary device, such as hard disc devices, a rotary shaft having a hub on one end is provided in a bearing of a sleeve so as to be rotatable. Thrust hydrodynamic grooves are provided on the other end surface of the rotary shaft, to form a thrust bearing with the thrust plate. A communication path is provided in the sleeve. The second gap between the hub and the sleeve end surface is used as a flow channel and is connected to the communication path. In this way, the rotation friction torque of the thrust bearing can be made sufficiently small, and internal pressure in bonded portions of the rotary shaft or the bottom plate can be suppressed. Thus, the oil can be prevented from oozing out from a small space of the bonded surfaces. Furthermore, the hydrodynamic bearing can be made thin. These effects can be combined to realize an optimal hydrodynamic bearing rotary device.

20 Claims, 13 Drawing Sheets

FOREIGN PATENT DOCUMENTS

| | | | | |
|---|---|---|---|---|
| JP | 11131107 | A * | 5/1999 |
| JP | 2001135538 | A * | 5/2001 |
| JP | 2003-88033 | | 3/2003 |
| JP | 2003294027 | A * | 10/2003 |
| JP | 2004239387 | A * | 8/2004 |
| JP | 2004270820 | A * | 9/2004 |
| JP | 2005-45876 | | 2/2005 |
| JP | 2006-29565 | | 2/2006 |

* cited by examiner

HYDRODYNAMIC BEARING ROTARY DEVICE AND INFORMATION APPARATUS

BACKGROUND OF THE INVENTION

I. Technical Field

The present invention relates to a hydrodynamic bearing rotary device employing a hydrodynamic bearing, and an information apparatus including the same.

II. Description of Related Art

In recent years, recording apparatuses and the like using discs to be rotated have experienced an increase in memory capacity and an increase in the transfer rate for data. Thus, bearings used for such recording apparatuses are required to have high performance and high reliability to receive a disc and rotate a load constantly with high accuracy. Accordingly, hydrodynamic bearing devices suitable for high-speed rotation are used for such rotary devices.

The hydrodynamic bearing rotary device has a lubricant such as oil between a rotary shaft and a sleeve, and generates a pumping pressure (hydrodynamic pressure) by hydrodynamic grooves during rotation. Thus, the shaft rotates in a non-contact state with respect to the sleeve. Since no mechanical friction is generated, the hydrodynamic bearing rotary device is suitable for high-speed rotation.

Hereinafter, an example of a conventional hydrodynamic bearing rotary device will be described with reference to FIGS. 8 through 10 (see, for example, Japanese Laid-Open Publication No. 2003-88033). As shown in FIG. 8, a conventional hydrodynamic bearing rotary device includes a sleeve 21, a rotary shaft 22, a stopper 23, a bottom plate 24, a lubricant 25, a hub 27, a base plate 28, a rotor magnet 29, a stator 30, and a disc 11.

The rotary shaft 22 is press-fitted to the hub 27. The rotary shaft 22 is inserted into a bearing hole 21A of the sleeve 21 so as to be rotatable. On at least one of an outer peripheral surface of the rotary shaft 22 and an inner peripheral surface of the sleeve 21, radial hydrodynamic grooves 21B are formed to form a radial bearing portion. On a surface of the sleeve 21 opposing the hub 27, thrust hydrodynamic grooves 21D having a spiral pattern as shown in FIG. 9 are formed to form a thrust bearing portion. The bottom plate 24 shown in FIG. 8 is adhered to the sleeve 21. The sleeve 21 has a flange portion 21C on an outer peripheral surface on the side facing the hub. The flange portion 21C has a larger diameter and an outer peripheral surface thereof includes a tapered surface 21E. A seal portion 26 is provided between the tapered surface 21E and a circular protrusion 27A of the hub 27. The stopper 23 having a ring shape is fixed to the hub 27, and is placed so as to oppose the flange portion 21C of the sleeve 21. The lubricant 25 is sealed in the bearing cavity, and a gas-liquid interface is formed near the seal portion 26.

To the base plate 28, the sleeve 21 is fixed. The stator 30 is also fixed to the base plate 28 so as to oppose the rotor magnet 29. To the hub 27, the rotor magnet 29 is fixed, and the disc 11 is fixed by a clamper (not shown). Magnetic centers of the rotor magnet 29 and the stator 30 in an axial direction are largely shifted, and thus, the rotor magnet 29 can generate an attraction force in a direction indicated by arrow A in the figure.

Operations of the conventional hydrodynamic bearing rotary device described above are as follow.

In the conventional hydrodynamic bearing rotary device shown in FIG. 8, when an electric current is supplied to the stator 30, a rotary magnetic field is generated, and a rotary force is applied to the rotor magnet 29. Thus, the rotor magnet 29 starts to rotate with the hub 27, the rotary shaft 22, the stopper 23, and the disc 11. As these members rotate, the radial hydrodynamic grooves 21B gather the lubricant 25 filled in the bearing gap, and a pumping pressure is generated between the rotary shaft 22 and the sleeve 21. In this way, the radial bearing portion functions. The thrust hydrodynamic grooves 21D gather the lubricant 25, and a pumping pressure (a pressure indicated by arrow P in FIG. 8) is generated between the hub 27 and the sleeve 21 in a thrust direction. The rotary part floats in a direction opposite to the attraction force of the rotor magnet 29 which is indicated by arrow A in the figure, and starts to rotate in a non-contact state.

As described above, the rotary shaft 22 can be rotated in a non-contact state with respect to the sleeve 21. With a magnetic head 42 as shown in FIG. 11, data can be recorded/reproduced to/from a rotating disc 11.

SUMMARY OF THE INVENTION

However, the above conventional hydrodynamic bearing rotary device has the following problems. The portions indicated by M and N in FIG. 8 receive the pressure indicated by arrow P in the figure caused by the thrust hydrodynamic grooves 21D during rotation. A pressure difference between atmospheric pressure and an internal pressure higher than that may cause the lubricant 25 to ooze out from a small space between the rotary shaft 22 and the hub 27 in the portion M and a small space between the bottom plate 24 and the sleeve 21 in the portion N. Further, since the thrust hydrodynamic grooves 21D have to be designed to have a large diameter, a friction torque at the thrust bearing portion becomes large, as much as or more than that at the radial bearing portion. Furthermore, the friction torque becomes large at low temperatures, as shown in FIG. 10. This causes problems that startup time becomes long, and the motor requires more power consumption.

An object of the present invention is to provide a hydrodynamic bearing rotary device which can suppress a rotation friction to reduce power consumption of a motor, and an information apparatus including the same.

A hydrodynamic bearing rotary device according to the first invention includes a sleeve, a rotary shaft, a thrust plate, and a hub. The sleeve is formed into a shape like a tubular shape. The rotary shaft has a first surface in a direction orthogonal to an axial direction of the sleeve. The rotary shaft is fitted to the sleeve and supported so as to be rotatable with respect to the sleeve. The thrust plate is located at a position opposing the first surface. The hub is fixed to the rotary shaft at a position remote from the first surface and has an additional member receiving surface on which an additional member to a motor can be loaded. Between the first surface and the thrust plate, a first gap (S1) to which a lubricant is injected is formed. Between the hub and an end surface of the sleeve on the side near the hub along the axial direction, a second gap (S2) to which the lubricant is injected is formed. Widths of the second gap (S2) and the first gap (S1) satisfy the following relational expression (1):

$$S2 > S1 \qquad (1).$$

In such a structure, the second gap S2 is larger than the first gap S1. Thus, the second gap S2 can be secured irrespective of a position where the rotary shaft rotates in the gap between the sleeve and the thrust plate. In other words, since the second gap S2 formed between the hub and the sleeve end surface is constantly secured as a flow channel for the lubricant and is connected to the communication path, rotation friction torque of a thrust bearing can be made sufficiently small. As a result, power consumption of an incorporated motor can be reduced.

A hydrodynamic bearing rotary device according to the second invention is a hydrodynamic bearing rotary device of the first invention in which a third gap (G1) to which the lubricant is injected is formed between an inner peripheral surface of the sleeve and the rotary shaft. Between an outer peripheral surface of the sleeve on the side near the hub and an inner peripheral surface of the hub which opposes the outer peripheral surface, a fourth gap (G2) to which the lubricant is injected is formed. The third gap (G1), the second gap (S2) and the fourth gap (G2) satisfy the following relational expression (2):

$$G2 > S2 > G1 \qquad (2).$$

In such a structure, the width of the gap becomes narrower from the fourth gap G2 via the second gap S2 to the third gap G1. Thus, the lubricant injected into the fourth gap G2, the second gap S2, and the third gap G1 is affected by surface tension which pushes the lubricant in a direction from the fourth gap G2 via the second gap S2 to the third gap G1. As a result, the lubricant can be prevented from leaking out.

A hydrodynamic bearing rotary device according to the third invention includes a sleeve, a rotary shaft, a hub, a thrust plate, a thrust bearing portion, a radial bearing portion, a second gap, a communication path, a fourth gap, and a lubricant. The sleeve has a bearing hole. The rotary shaft is inserted into the bearing hole of the sleeve so as to be rotatable. The hub has a disc receiving surface on which a disc can be loaded, which is attached to one end of the rotary shaft. The thrust plate is placed so as to oppose an end surface of the other end of the rotary shaft. The second gap is provided between the hub and an end surface of the sleeve and has a minimum gap S2. The thrust bearing portion has thrust hydrodynamic grooves formed on at least one of the thrust plate and the end surface of the other end of the rotary shaft. The thrust bearing portion is provided in a first gap which is a gap S1. The radial bearing portion has radial hydrodynamic grooves formed on at least one of an outer peripheral surface of the rotary shaft and an inner peripheral surface of the sleeve. The radial bearing portion is formed in a third gap which is a gap G1. The communication path is provided to connect the first gap and the second gap. The fourth gap is provided between an outer peripheral surface of the sleeve on the side near the hub and an inner peripheral surface of the hub, which has a diameter slightly larger than that of the outer peripheral surface, and has a maximum gap G2. The lubricant is injected into the communication path, the first gap, the second gap, the third gap, and the fourth gap. Widths of the gaps S1, S2, G1 and G2 satisfy the relations, S2>S1 and G2>S2>G1.

In this structure, the widths of the gaps S1, S2, G1 and G2 satisfy the relations, S2>S1 and G2>S2>G1. The rotary shaft having the hub on one end is provided in the bearing of the sleeve so as to be rotatable. The thrust hydrodynamic grooves are provided on at least one of the other end surface of the rotary shaft and the thrust plate, to form the thrust bearing with the thrust plate. The communication path is provided in the sleeve. The second gap between the hub and the sleeve end surface is used as the flow channel and is connected to the communication path.

In this way, the rotation friction torque of the thrust bearing can be made sufficiently small, and the internal pressure in the bonded portions of the rotary shaft or the bottom plate can be suppressed. Thus, the oil is prevented from oozing out from a small space of the bonded surfaces. Furthermore, the hydrodynamic bearing can be made thin. These effects can be combined to realize an optimal hydrodynamic bearing rotary device.

A hydrodynamic bearing rotary device according to the fourth or twelfth invention is a hydrodynamic bearing rotary device of the first or eleventh invention in which the sleeve has a flange portion protruding in a direction orthogonal to an axial direction near the hub on a surface opposing the hub. The hub has a stopper ring to be hooked to the flange portion.

With such a structure, the hub is hooked to the flange portion by the stopper ring. Thus, the rotary shaft can be prevented from coming out of the sleeve.

A hydrodynamic bearing rotary device according to the fifth or the thirteenth invention is a hydrodynamic bearing rotary device of the first or eleventh invention in which, on the outer peripheral surface of the sleeve which defines the fourth gap, a surface is formed such that the gap becomes narrower toward the second gap.

In this structure, the surface which has the gap becoming narrower toward the second gap, i.e., a tapered shape, is formed between the outer peripheral surface of the sleeve on the side near the hub and the inner peripheral surface of the hub opposing the outer peripheral surface. By providing such a tapered shape, surface tension is applied to the lubricant injected in the fourth gap G2. Thus, the lubricant can be prevented from leaking out.

A hydrodynamic bearing rotary device according to the sixth or fourteenth invention is a hydrodynamic bearing rotary device of the first or eleventh invention further including a base plate for fixing the sleeve. The hub includes a rotor magnet. The rotor magnet generates a magnetic attraction force in a direction toward the base plate.

With such a structure, a magnetic attraction force can be generated by the rotor magnet in a direction toward the base plate, and a force in a direction from the rotary shaft toward the thrust plate can be generated.

A hydrodynamic bearing rotary device according to the seventh or fifteenth invention is a hydrodynamic bearing rotary device of the first or eleventh invention in which the sleeve includes a sintered sleeve and a sleeve collar. The sintered sleeve is formed of metal sintered material. The sleeve collar surrounds the outer circumference of the sintered sleeve. Between the sintered sleeve and the sleeve collar, the communication path which connects the first gap and the second gap is formed.

In this structure, the communication path which connects the first gap and the second gap is formed between the sintered sleeve and the sleeve collar.

Thus, a circulation passage formed of the first gap, the third gap, and the second gap through the communication path can be formed. As a result, the lubricant can circulate through the circulation passage.

Since the sleeve is formed of two components, the sintered sleeve and the sleeve collar, a fundamental form of the sintered sleeve can be made closer to a simple cylindrical shape. As a result, accuracy of sintering the sintered sleeve can be improved, and the yield is also improved. Further, a structure of a die for sintering can be simplified so the cost for the die can be suppressed and die accuracy can be improved. Thus, bearings suitable for mass production can be provided.

A hydrodynamic bearing rotary device according to the eighth or sixteenth invention is a hydrodynamic bearing rotary device of the seventh or fifteenth invention in which the sintered sleeve includes iron or copper as a main component. A sintered density of the sintered sleeve is 90% or higher. A surface of the sintered sleeve is provided with a triiron tetroxide film or treated with electroless nickel plating. The density of the sintered metal material may refer to either an average density of the sintered components (volume density) or a density of a surface (area density). However, as used herein, density refers to the volume density obtained by dividing the mass after degreasing by the volume, as defined in JIS Z2501.

In this structure, the surface of the sintered sleeve is provided with a triiron tetroxide film, or treated with electroless nickel plating. Thus, pores on the surface of the sintered material are sealed, and the hydrodynamic pressures can be prevented from deterioration, which may be caused by penetration of the lubricant from the bearing surface into the base material of the sintered sleeve. In this way, bearings suitable for mass production which have high bearing stiffness can be provided. At the same time, abrasion resistance property and antirust effect can be achieved.

Accordingly, a hydrodynamic bearing rotary device with high reliability which can be used for a long term can be achieved.

A hydrodynamic bearing rotary device according to the ninth or seventeenth invention is a hydrodynamic bearing rotary device of the first or eleventh invention in which the additional member is at least one of a magnetic disc, an optical disc, a polygon minor, and a rotary head.

With such a structure, the present invention can be applied to various apparatuses including, for example, magnetic discs such as HDDs and FDDs or optical discs such as CD-ROMs, DVDs, MOs and the like, polygon minors used for laser scanner/printers or the like, rotary heads used for rotary head devices such as VCRs and the like.

An information apparatus according to the tenth or eighteenth invention includes a hydrodynamic bearing rotary device of the first or eleventh invention and a head portion. The head portion inputs and outputs data to and from a disc for recording data which is to be fitted to the rotary shaft and formed into a disc-like shape.

With such a structure, effects similar as those of the hydrodynamic bearing rotary device according to the above inventions can be achieved.

This means that, since the second gap is larger than the first gap, the hub and the sleeve do not contact each other irrespective of the position where the rotary shaft rotates in the gap between the sleeve and the thrust plate. As a result, the rotation friction can be reduced.

A hydrodynamic bearing rotary device according to the eleventh invention includes a sleeve, a rotary shaft, a hub, and a thrust plate. The hydrodynamic bearing rotary device according to the eleventh invention also has the first gap (S1), the second gap (S2), the third gap (G1), and the fourth gap. The sleeve has a bearing hole. The flangeless rotary shaft is inserted into the bearing hole of the sleeve so as to be relatively rotatable. The hub is attached to one end of the rotary shaft and has an additional member receiving surface on which an additional member to a motor can be loaded. The thrust plate is fixed so as to oppose the other end of the rotary shaft. The first gap (S1) is formed between an end surface of the other end of the rotary shaft and the thrust plate with a lubricant being injected. The second gap (S2) is formed between a surface of the hub and a one end surface of the sleeve on the side of the one end of the rotary shaft, which oppose one another. The third gap (G1) has radial hydrodynamic grooves formed on at least one of an outer peripheral surface of the rotary shaft and an inner peripheral surface of the sleeve. The fourth gap is formed between an outer peripheral surface of the sleeve on the side of the one end surface and an inner peripheral surface of the hub, which has a diameter slightly larger than that of the outer peripheral surface of the sleeve. The maximum gap of the fourth gap is a maximum gap (G2). A width of the maximum gap (G2) of the fourth gap is set to satisfy the following relational expression (3):

$$G2 > S2 > G1 \qquad (3).$$

The lubricant tends to move toward the smaller gap due to the surface tension. Thus, the lubricant is moved from the fourth gap (G2) toward the second gap (S2), and then, from the second gap (S2) to the radial hydrodynamic bearing portion (G1) by the oil sealing effect. Thus, it is ensured that the lubricant is kept in the bearing cavity.

A hydrodynamic bearing type rotary device according to the nineteenth, twentieth or twenty first invention is a hydrodynamic bearing rotary device of the third, fifth or thirteenth invention in which a minimum gap G20 of the fourth gap is formed to have a width which satisfies the following relational expression (4):

$$G20 > S2 \qquad (4)$$

The lubricant tends to move toward the smaller gap due to the surface tension. Thus, since the fourth gap is always larger than the second gap even if the lubricant evaporates and a lubricant surface nears the second gap, the lubricant moves towards the second gap According to the hydrodynamic bearing rotary device of the present invention, hydrodynamic bearing rotary device which can reduce a rotation friction torque in a bearing and reduce power consumption of a motor or the like, and an information apparatus which includes the same can be provided.

DETAILED DESCRIPTION OF THE INVENTION

Hereinafter, an embodiment which specifically shows the best mode for carrying out the invention will be described with reference to the drawings. The terms "upper" and "lower" as used herein refer to a direction toward one end and to the other end of a rotary shaft 2. These terms are used with an intention to help understanding the drawings, and the present invention is not limited by these terms.

First Embodiment

Hereinafter, an exemplary hydrodynamic bearing rotary device of the present embodiment will be described with reference to FIGS. 1 through 7.

Figure 1:
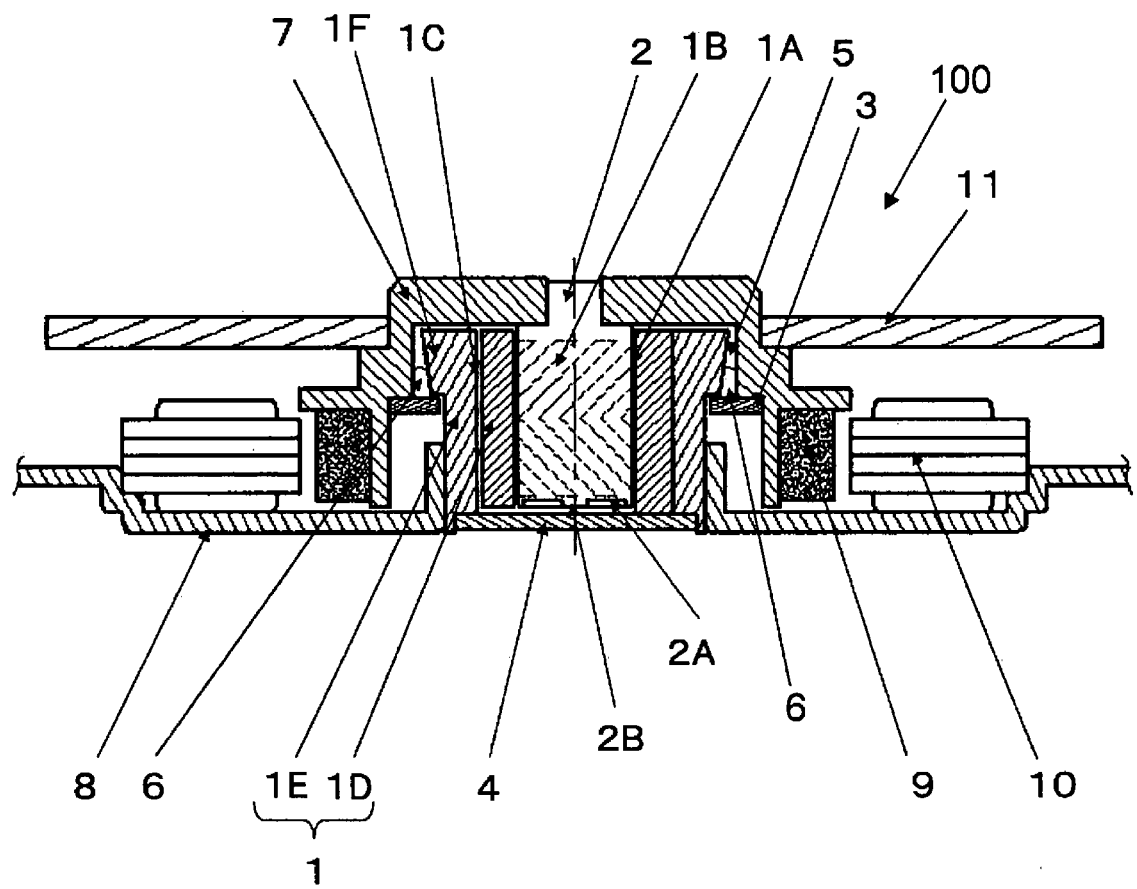
FIG. 1 is a cross-sectional view of a hydrodynamic bearing device according to an embodiment of the present invention.
Figure 3:
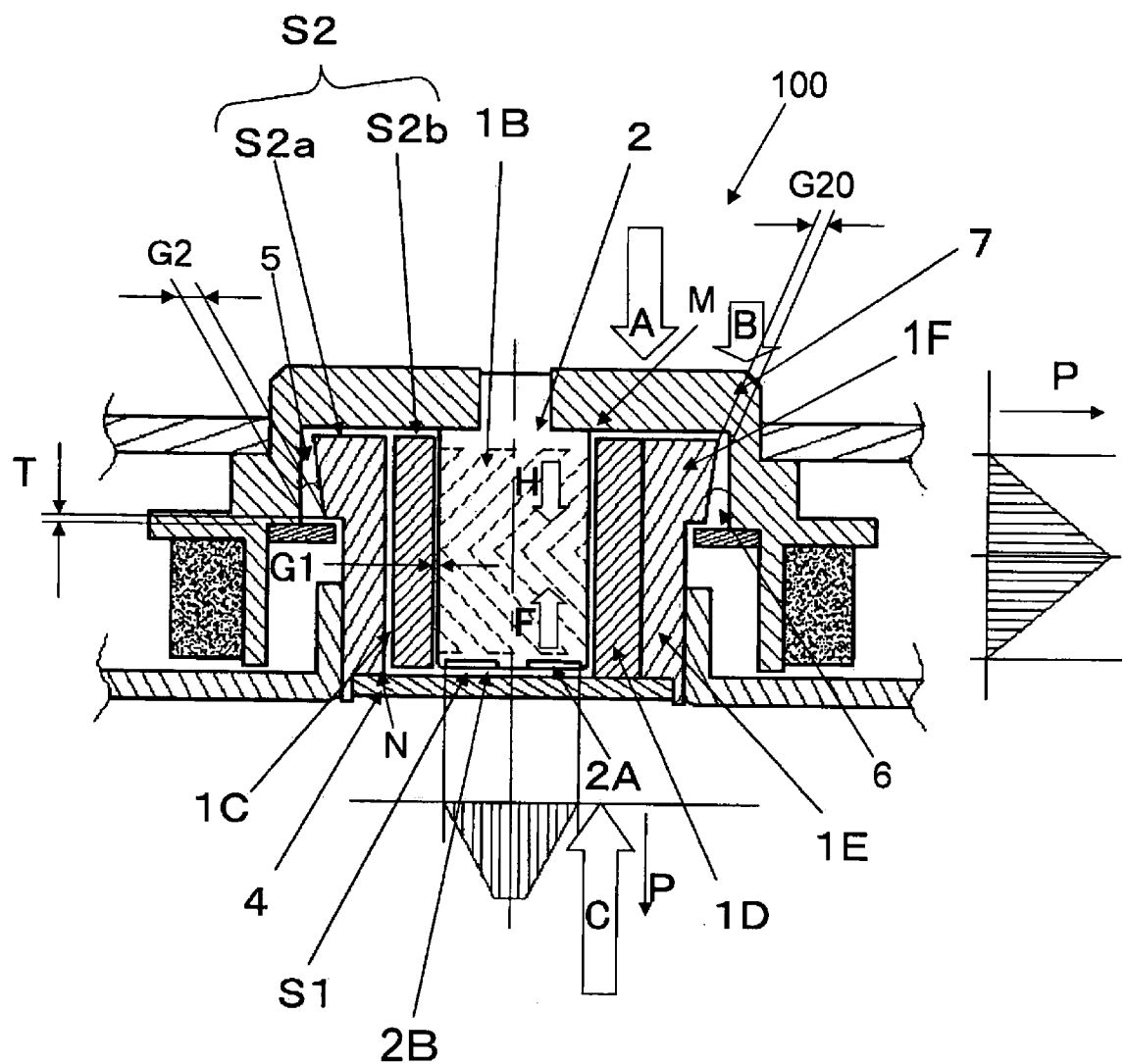
FIG. 3 is a detailed cross-sectional view of the hydrodynamic bearing

As shown in FIGS. 1 and 3, a hydrodynamic bearing rotary device 100 according to the present embodiment includes a sleeve 1, a rotary shaft 2, a thrust plate 4, a lubricant 5 such as oil or the like, a hub 7, a base plate 8, a rotor magnet 9, and a stator 10.

The sleeve 1 extends along an axial direction of the rotary shaft 2, which will be described later in detail, and is formed into a shape like a tubular shape. Near a central portion of the sleeve 1, a bearing hole 1A is provided.

The rotary shaft 2 is fitted to a bearing hole 1A of the sleeve 1 so as to be rotatable. More specifically, the arrangement of the rotary shaft 2 is as follows. A lower end surface 2B of the rotary shaft 2 is processed to have right angles, and inserted into the bearing hole 1A of the sleeve 1 so as to be rotatable. In this way, a radial bearing portion having a gap indicated by G1 in FIG. 3 is formed. On at least one of an outer peripheral surface of the rotary shaft 2 and an inner peripheral surface of the sleeve 1, radial hydrodynamic grooves 1B are formed. On at least one of a surface of the lower end surface 2B of the rotary shaft 2 and a surface of the thrust plate 4, which oppose one another, thrust hydrodynamic grooves 2A are formed. The sleeve 1 includes a communication path 1C which is formed substantially parallel to the bearing hole 1A.

The thrust plate 4 is fixed to the sleeve 1 by a method such as adhering, press fitting, caulking, welding, or the like.

The hub 7 is located immediately above the rotary shaft 2. The hub 7 is formed into a shape like a cup (which means a cross-section of the rotary shaft 2 in the axial direction draws a substantially U-shaped configuration with an opening facing the sleeve 1). The hub 7 having a disc receiving surface on which a disc can be loaded is fixed to the shaft 2 by a method such as press fitting, press-fit adhering, laser-welding, or the like. The sleeve 1 has a flange portion 1F on the side of a surface opposing the hub 7.

An inner peripheral surface of the hub of the cup-like shape has a diameter slightly larger than that of an outer peripheral surface of the flange portion 1F. Between such an inner peripheral surface of the hub and the flange portion 1F, a fourth gap 6 is provided. The fourth gap 6 is a seal portion having a maximum gap which is indicated by G2 in FIG. 3 (hereinafter, a width of the fourth gap 6 is indicated as G2).

Now, a circulation passage through which the lubricant 5 circulates is described more specifically.

A first gap S1 is formed between the lower surface 2B of the rotary shaft 2 and the thrust plate 4. A second gap S2 (herein, gap S2 refers to a smaller one of gaps S2a and S2b) is formed between an upper end surface of the sleeve 1 and the hub 7. A third gap G1 is formed between the bearing hole 1A and the rotary shaft 2 which is fitted into the bearing hole 1A. The communication path 1C is formed to connect the first gap S1 and the second gap S2.

The first gap S1, the second gap S2, the third gap G1, and the fourth gap 6 described above form a bearing gap having a shape like a bag, which is filled with the lubricant 5, and a loop through which the lubricant 5 circulates is formed.

The flange portion 1F is formed in order to prevent the rotary shaft 2 from coming out from the sleeve 1 by being engaged to a stopper 3 having a ring shape (stopper ring) which is fixed to the hub 7 by press fitting, adhering, press-fit adhering, caulking, laser-welding, or the like. The symbol T in the drawings (see FIG. 3) indicates a gap between the flange portion 1F of the sleeve 1 and the stopper 3.

To the base plate 8, the sleeve 1 is fixed. The stator 10 is also fixed to the base plate 8 so as to oppose the rotor magnet 9. On the other hand, to the hub 7 made of a magnetic material, the rotary shaft 2 is fixed along with the rotor magnet 9 and a disc 11.

Hereinafter, operations of the hydrodynamic bearing rotary device 100 of the present embodiment will be described. In the hydrodynamic bearing rotary device 100 illustrated by FIGS. 1 through 3, when an electric current is supplied to the stator 10, a rotary magnetic field is generated and a rotary force is applied to the rotor magnet 9. This causes the rotor magnet 9 to start rotating with the hub 7, the rotary shaft 2, the stopper 3, and the disc 11. As these members rotate, radial hydrodynamic grooves 1B and thrust hydrodynamic grooves 2A gather the lubricant 5 including oil, high-fluidity grease, ionic liquid or the like, which is filled in the bearing gap. Pumping pressures are applied to the lubricant 5 in the radial bearing portion between the rotary shaft 2 and the sleeve 1, and in the first gap S1. Thus, the rotary shaft 2 can be rotated in a non-contact state with respect to the sleeve 1 and the thrust plate 4. With a magnetic head or an optical head (not shown), data can be recorded/reproduced to/from a rotating disc 11.

Figure 2:
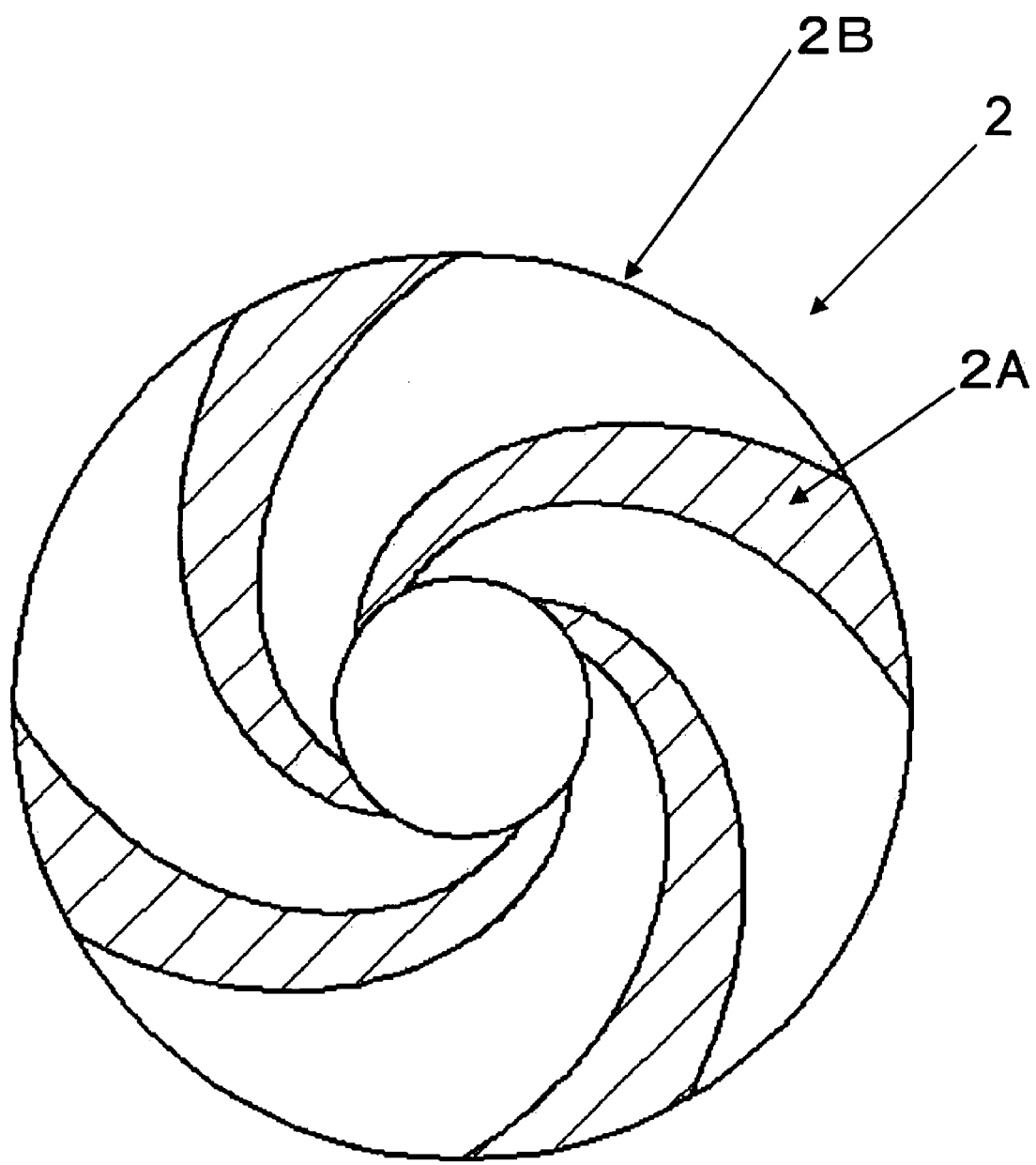
FIG. 2 is a detailed plan view of the thrust hydrodynamic grooves.

The thrust hydrodynamic grooves 2A are formed in a spiral pattern as shown in FIG. 2. However, as necessary, they may be formed in a herringbone pattern. The hydrodynamic grooves 1B are formed in a symmetrical herringbone pattern. As necessary, an asymmetrical pattern in a direction to cause the lubricant 5 to flow from the thrust plate 4 side toward the hub 7 may be employed. By employing such a pattern, a force for transferring the lubricant 5 toward the radial hydrodynamic grooves 1B can be increased to prevent oil film rupture.

As shown in FIG. 3, given that the first gap between the lower end surface 2B and the thrust plate 4 is indicated by S1, the gap between the rotary shaft 2 and the bearing hole 1A of the sleeve 1 is indicated by G1 (the third gap G1), and the second gap between the upper end surface of the sleeve 1 and the hub 7 is indicated by S2 (gap S2 refers to a smaller one of gaps S2a and S2b), the widths of the gaps are set to be S2>S1. With such a relationship, the second gap S2 can always remain irrespective of the position where the rotary shaft 2 rotates within the gap between the sleeve 1 and the thrust plate 4. Thus, the second gap S2 can always be filled with the lubricant 5. Therefore, the second gap S2 serves as a fluid path for the lubricant 5 rather than being a bearing surface. Herein, the gaps S2a and S2b respectively represent a gap between the hub 7 and an outer sleeve 1E and a gap between the hub 7 and an inner sleeve 1D in the case where the sleeve is formed of the inner sleeve 1D and the outer sleeve 1E instead of being integral.

As shown in FIG. 3, the radial hydrodynamic grooves 1B generates a pressure distribution in a direction orthogonal to the axial direction of the rotary shaft 2 as indicated by P on the right-hand side of the figure and the pressure is applied to the lubricant 5. The thrust hydrodynamic grooves 2A generate a pressure distribution in the axial direction of the rotary shaft 2 as indicated by P in a lower part of FIG. 3, and apply it to the lubricant 5. A supporting force upward in the axial direction which is indicated by arrow C in the figure is acting on the rotary shaft 2. Further, a force which is caused between the rotor magnet 9 (FIG. 1) and the base plate 8 in the axial direction is acting in a direction of arrow A in FIG. 3 (i.e., a direction downward in the axial direction). When the empty weight of the rotating part is represented by symbol B, the level to which the lower end surface 2B floats and the position of rotation are automatically defined such that the relationship, A+B=C, is satisfied. In the present invention, the force in the direction of arrow A is about 10 to 15 grams. Therefore, if the hydrodynamic grooves are designed optimally, the rotary shaft can quickly float by the force of the thrust hydrodynamic grooves 2A as the bearing starts to rotate. In this way, rubbing and abrasion at the bearing when operation starts or stops can be prevented.

Figure 8:
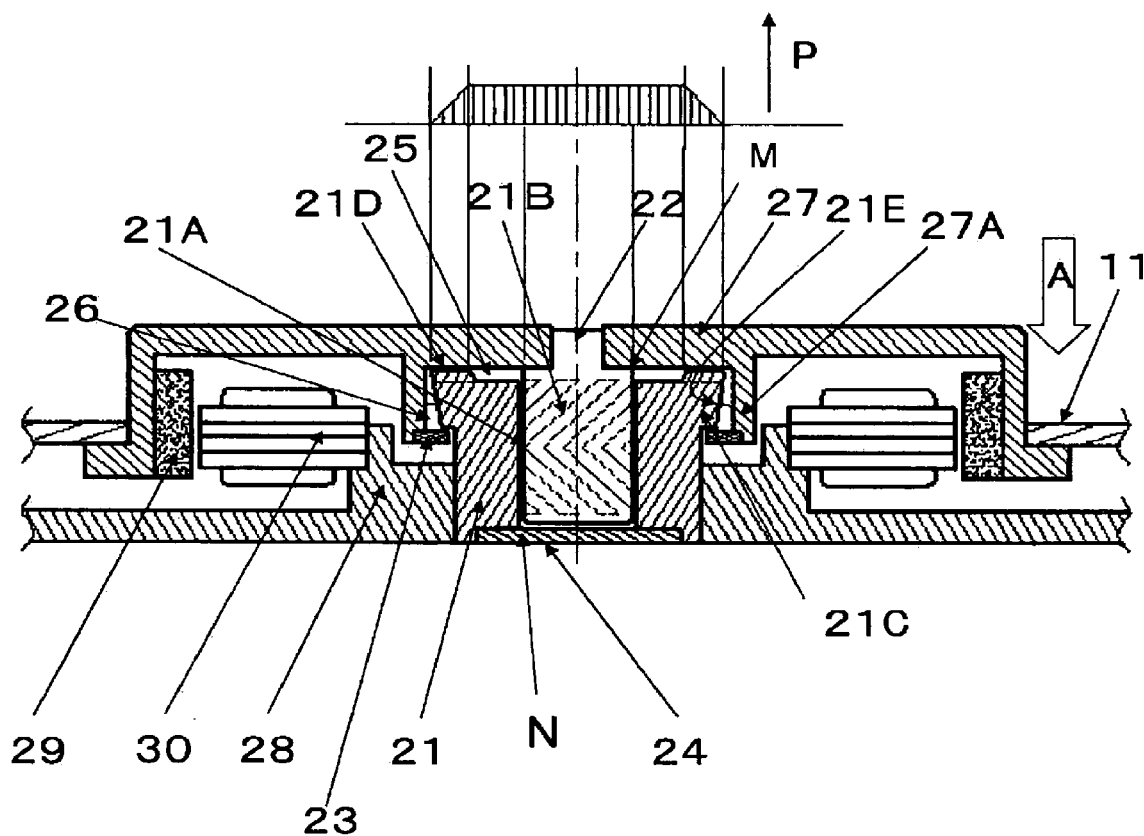
FIG. 8 is a cross-sectional view of a conventional hydrodynamic bearing device.
Figure 9:
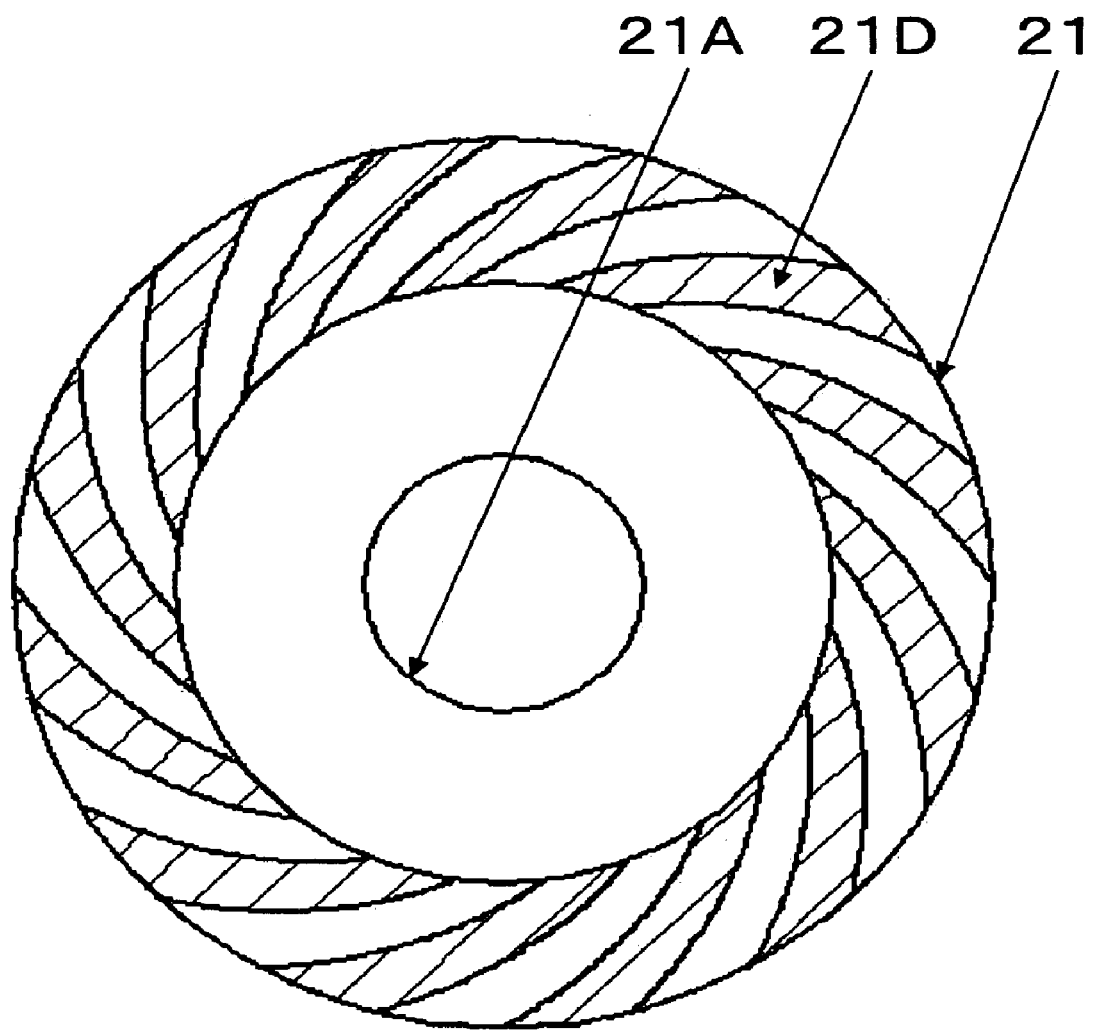
FIG. 9 is a detailed plan view of thrust bearing hydrodynamic grooves of the hydrodynamic bearing device.
Figure 10:
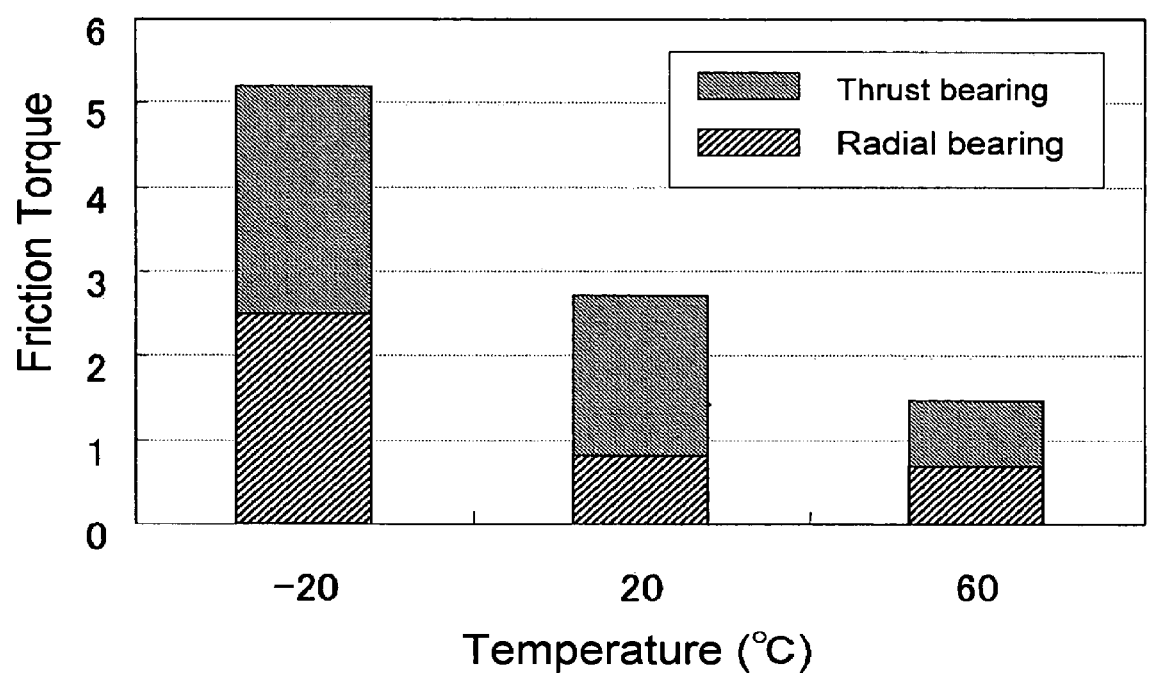
FIG. 10 is a diagram illustrating a friction torque of the hydrodynamic bearing device.

With reference to FIG. 3, in a jointed surface where the rotary shaft 2 and the hub 7 are bonded by press-fitting, adhering, press-fit adhering, laser-welding, or the like, hydrodynamic grooves are not formed in the second gap S2 unlike the conventional example shown in FIG. 8. Thus, there is no factor to increase pressure acting on the lubricant 5. Since the second gap S2 is adjacent to the fourth gap 6, which is a seal portion opened to the atmospheric pressure, the pressure P during rotation is almost equal to the atmospheric pressure and no high pressure is generated. Thus, there is no need to worry that the lubricant 5 may ooze out from a small space. Similarly, the bonded portion between the sleeve 1 and the thrust plate 4 is connected to the second gap, which does not have hydrodynamic grooves, by the communication path 1C. Thus, the pressure P during rotation is almost equal to the atmospheric pressure, and no high pressure is generated. Therefore, there is no need to worry that the lubricant 5 may ooze out from a small space.

The radial hydrodynamic grooves 1B vary in their dimensions. Thus, when a pumping pressure which causes the lubricant 5 to flow upward as indicated by arrow F is generated, for example, the lubricant 5 flows from the second gap S2 through the communication path 1C. Then, the lubricant 5 is supplied to the radial bearing portion, and returns to the second gap, thereby forming a loop. The lubricant 5 circulates to cool the bearing surface. Also, minute bubbles of air eluted from the lubricant 5 are discharged from the bearing surface toward the second gap. When the radial hydrodynamic grooves 1B of the radial bearing portion have a variance in the groove pattern such that the lubricant 5 is transported in a direction indicated by arrow H, the lubricant 5 is supplied from the second gap S2 to the radial bearing portion. Then, the lubricant 5 flows through the communication path 1C to return to the second gap, thereby forming a loop in the opposite direction. The direction of the flow of the lubricant 5 in the loop does not make a big difference and either direction may be accepted.

Figure 4:
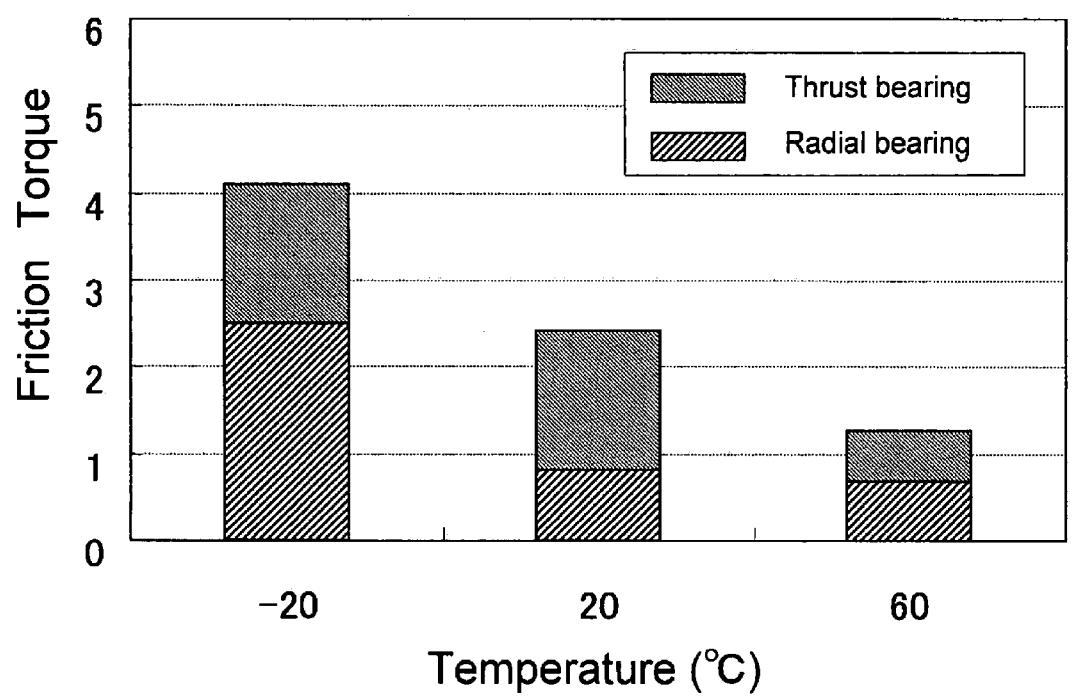
FIG. 4 is a diagram illustrating a proportion of friction torques of the hydrodynamic bearing device.

FIG. 4 shows the magnitudes of friction torques of the hydrodynamic bearing rotary device 100 of the present embodiment. It is shown that the friction torques of the radial bearing portion are almost the same as those in the conventional example. On the other hand, the thrust bearing portion has the thrust hydrodynamic grooves 2A with a small diameter, and thus, the friction torque can be suppressed. Therefore, the power consumption of the motor can be suppressed under all the temperature conditions.

Figure 5:
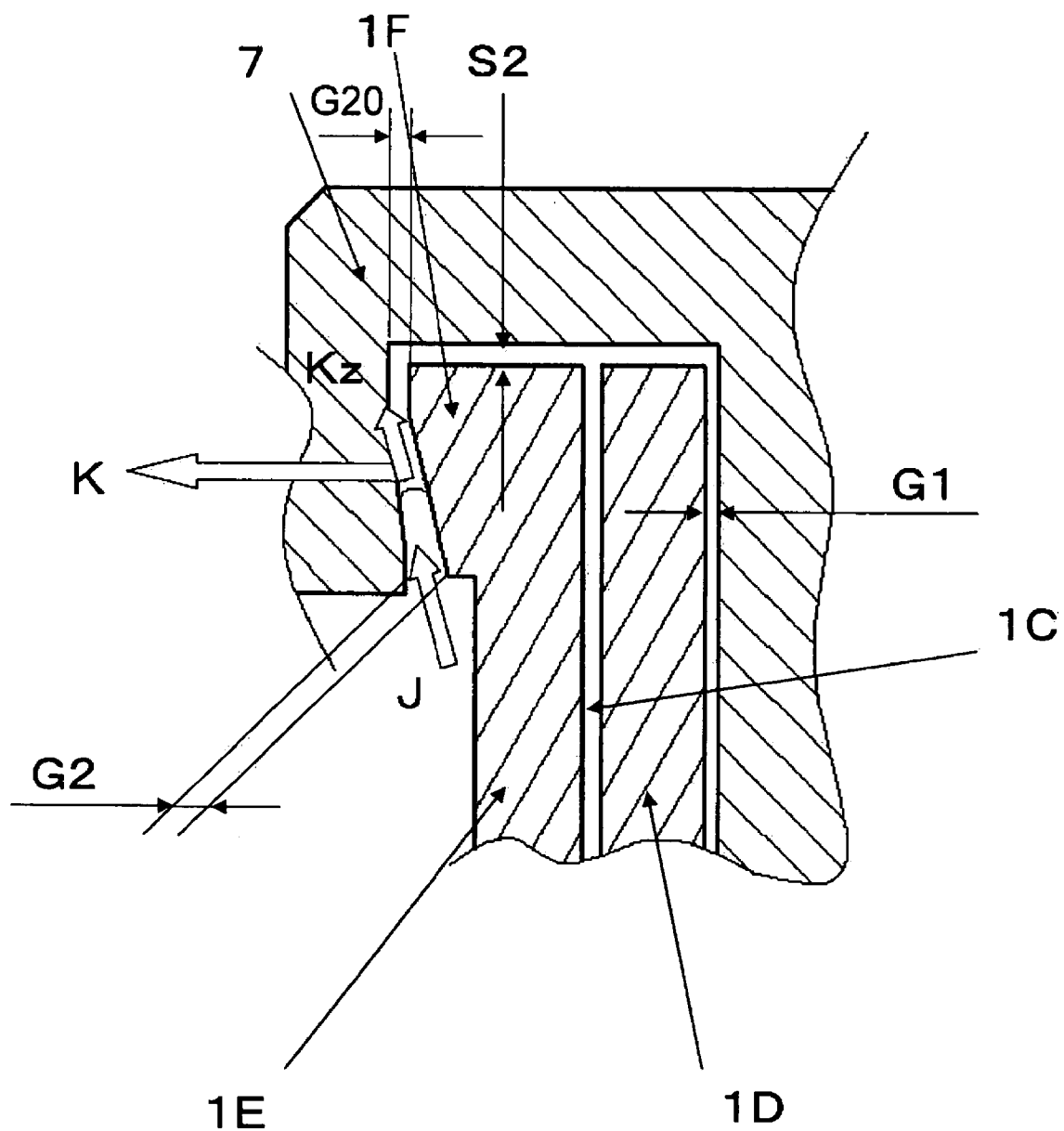
FIG. 5 is a detailed cross-sectional view of a fourth gap of the hydrodynamic bearing device.

As shown in FIG. 5, a diameter of the inner peripheral surface of the hub 7 having a shape substantially like a cup is slightly larger than that of the flange portion 1F of the sleeve 1. Between the outer peripheral surface of the flange portion 1F and the inner peripheral surface of the hub 7, the fourth gap 6 is formed. A surface of the flange portion 1F which opposes the inner peripheral surface of the hub 7 is formed to be inclined such that its diameter becomes larger toward the side of the second gap S2 from the side of the first gap S1. The forth gap 6 is formed to have a width which becomes larger toward the lower end in the axial direction of the sleeve 1 and becomes a maximum gap G2 at the lower end. The forth gap 6 is also formed such that the width becomes about the same as that of the second gap S2 in a portion near the upper end in the axial direction of the sleeve 1. The width of the fourth gap 6 is about 800 micrometers at the maximum part. As described above, the fourth gap 6 has a tapered shape such that the width of the gap in the axial direction of the rotary shaft 2 varies. Thus, a surface tension is acting on the lubricant 5 injected into the fourth gap 6.

Furthermore, as for a minimum width G20 of the fourth gap 6, it is preferable to design the fourth gap 6 so that the following relational expression (4) is satisfied.

$$G20 > S2 \tag{4}$$

Figure 6:
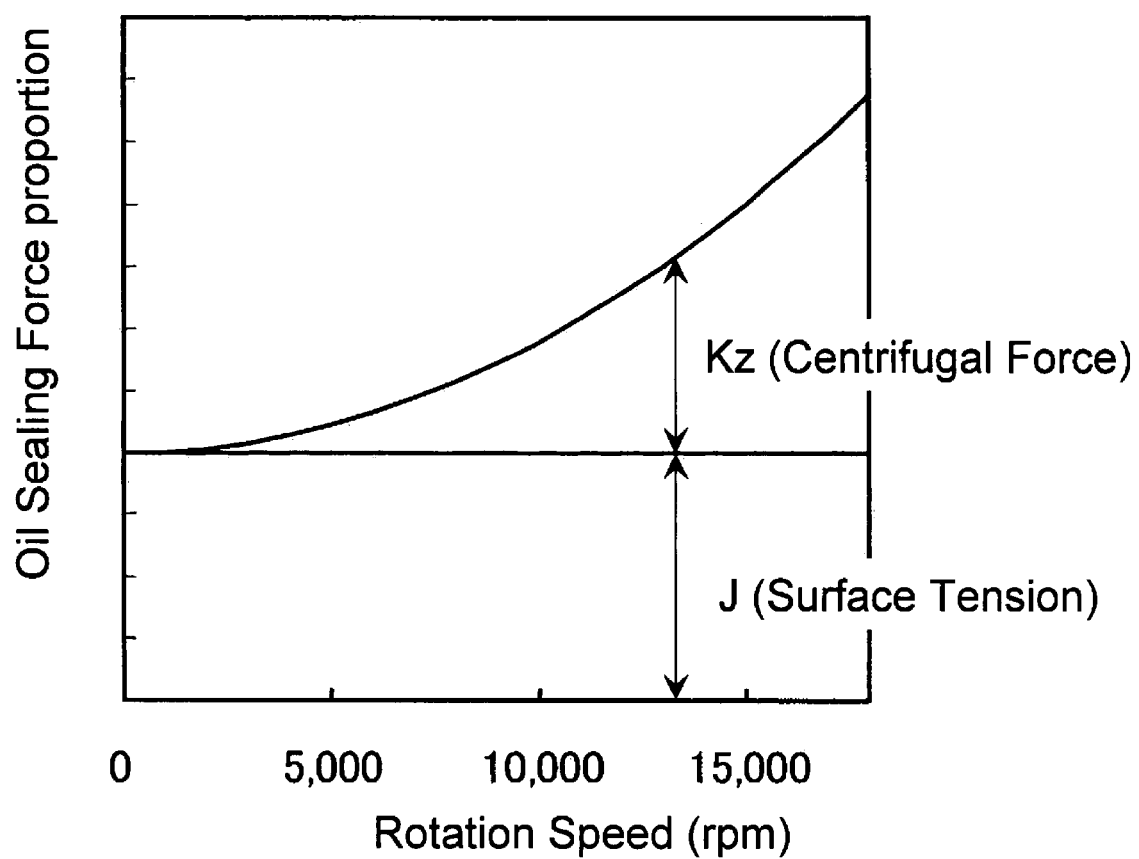
FIG. 6 is a diagram illustrating oil sealing force of the hydrodynamic bearing device.

The relationship between the third gap G1, the second gap S2, and the maximum gap G2 of the fourth gap 6 are designed to satisfy the relational expression, G2>S3>G1. Since the lubricant 5 tends to move toward the smaller gap due to the surface tension, the oil sealing effect can be obtained. FIG. 6 shows two forces: a component force (Kz) of centrifugal force (K) applied to the lubricant 5 in the fourth gap 6 which cause the lubricant 5 to seal; and oil sealing force (J) from the above-mentioned surface tension at different rotation speed of the bearing. The surface tension (J) does not depend upon the rotation speed and shows the constant value. On the other hand, the component force (Kz) of the centrifugal force (K) gradually increases depending upon the rotation speed. Since the oil sealing force is the sum of these two forces (J+Kz), the oil sealing force increases, and the lubricant 5 becomes less likely to leak. Contrary to the example shown in FIG. 5, if the inner peripheral surface of the hub 7 has a diameter becoming larger from one end (upper end in the figure) of the sleeve 1 toward the other end (lower end in figure), when the centrifugal force (K) is applied to the lubricant 5, the component force (Kz) thereof acts in a direction to run off the oil. The oil sealing force is a difference between these two forces (J-Kz). However, if the rotation rate is about 10,000 rpm or lower, the value of the difference (J-Kz) is enough for obtaining the oil sealing effect and the lubricant 5 does not flow out.

In the present invention, the sleeve 1 is formed of pure iron, stainless steel, copper alloy or the like. The rotary shaft 2 is formed of stainless steel or the like. The diameter thereof is 2 to 5 mm As the lubricant 5, ester oil with low viscosity is used. The sleeve 1 may be further treated by nickel plating.

The first gap S1 is about 3 micrometers, the second gap S2 is 10 to 100 micrometers, and the gap of the radial bearing portion (the third gap G1) is 1 to 5 micrometers.

In the second gap S2 provided between the hub 7 and the sleeve 1, spiral grooves may be machined on the lower surface of the hub 7 or the upper end surface of the sleeve 1 by a lathing process or the like as long as the pressures in the portions N and M in FIG. 3 do not become too large. Such grooves allow the lubricant 5 to readily flow inside.

In the hydrodynamic bearing rotary device 100 of the present invention, the second gap S2 is provided between the hub 7 and the sleeve 1. The second gap S2 is larger than the first gap S1 formed between the lower end surface 2B of the rotary shaft 2 and the thrust plate 4. The second gap S2 is connected to the communication path 1C. In this way, the second gap S2 can always be secured irrespective of the position of the rotary shaft 2 with respect to the sleeve 1. Thus, the rotation friction torque of the thrust bearing portion can be made sufficiently small. Also, there is an effect that the internal pressures acting on the lubricant 5 is suppressed in the bonded portions of the rotary shaft 2, the thrust plate 4 and the like, and the lubricant 5 is prevented from oozing out from a small space of the bonded portions. Furthermore, there is an effect that the hydrodynamic bearing rotary device 100 can be made thin.

Figure 11:
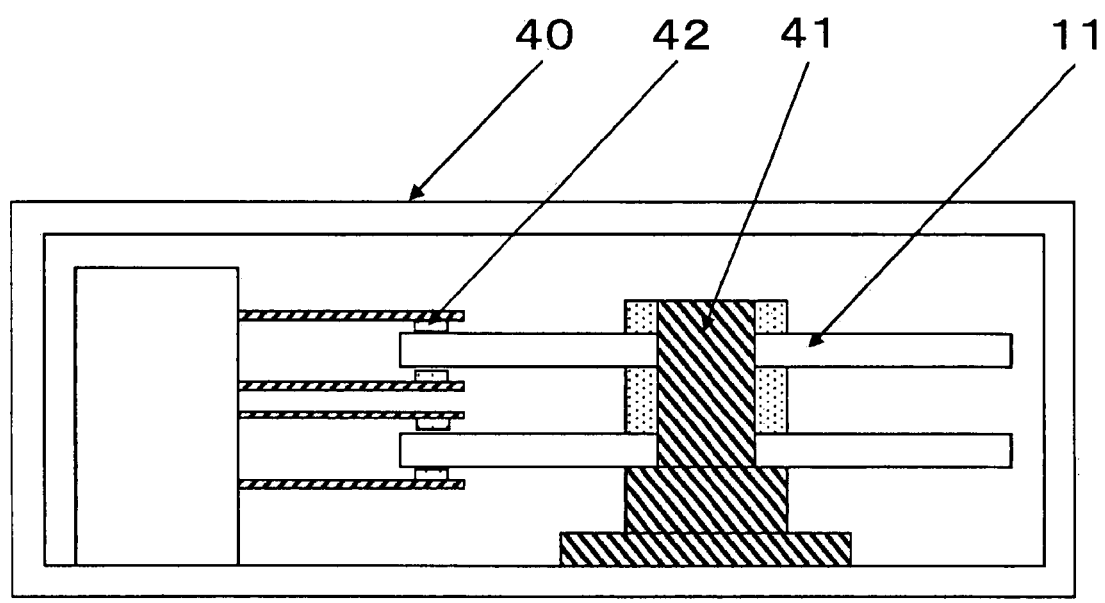
FIG. 11 is cross-sectional view of a recording and reproducing apparatus including a hydrodynamic bearing device.

FIG. 11 is a cross-sectional view of a recording and reproducing apparatus (information apparatus) 40 including a hydrodynamic bearing rotary device 41. It is possible to apply the hydrodynamic bearing rotary device 100 according to the present embodiment to the recording and reproducing apparatus 40. Specific example of such application is as follows.

The recording and reproducing apparatus 40 includes a hydrodynamic bearing rotary device 100, a disc 11, and a head portion 42. The disc 11 is fitted to the hub 7, and is for recording various data. The head portion inputs/outputs data to/from the disc 11.

With such a structure, the similar effects as described above can be achieved in the recording and reproducing apparatus 40.

Second Embodiment

Figure 7:
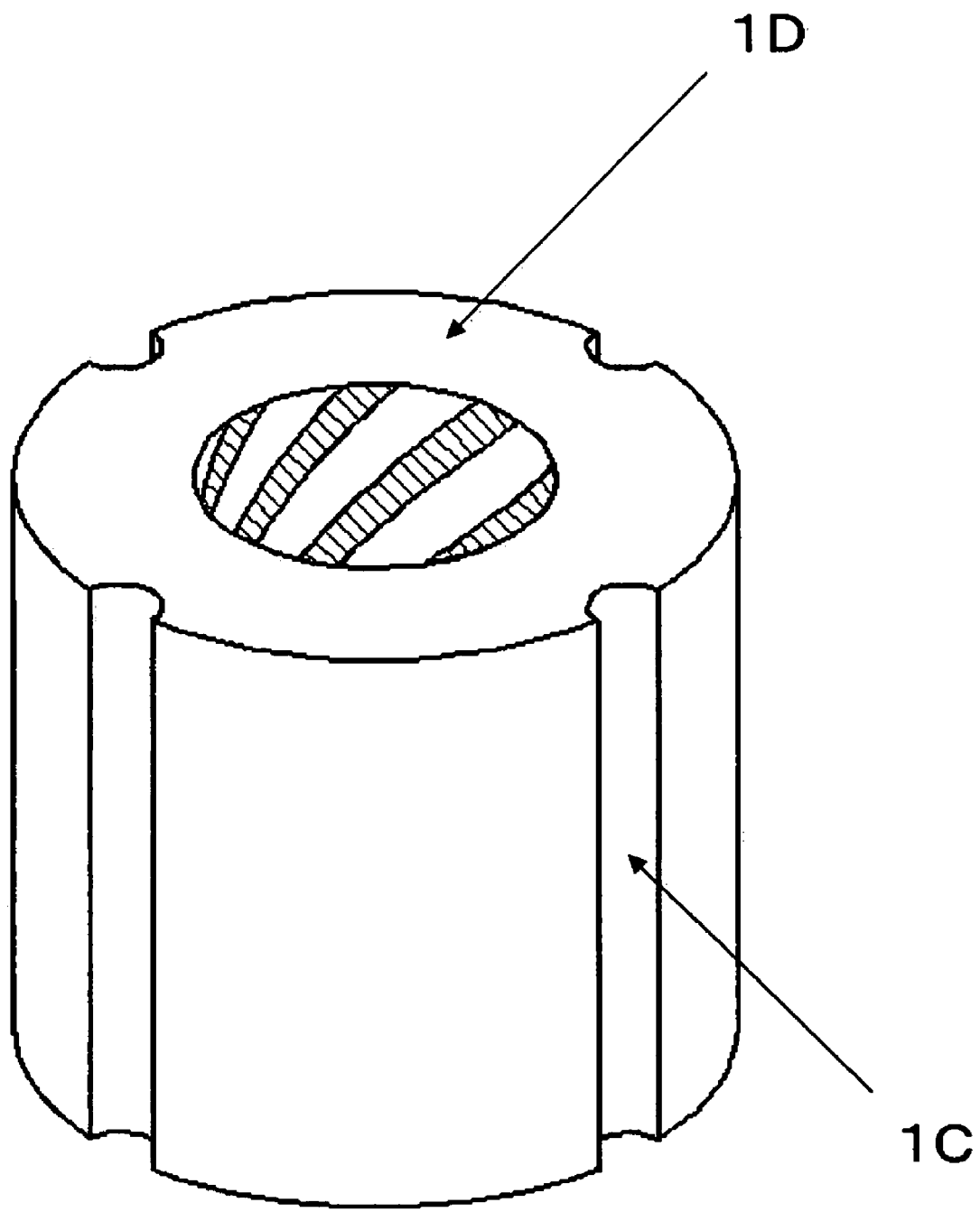
FIG. 7 is a perspective view of a sintered sleeve of the hydrodynamic bearing device.

As shown in FIG. 1, the sleeve 1 is a metal rod machined by a lathe or the like, and the communication paths 1C are machined by a drill or the like. However, the sleeve 1 may be formed by assembling two components: a sintered sleeve 1D formed by sintering the metal powder as shown in FIG. 7; and a sleeve collar 1E formed of metal or thermosetting resin. The sintered sleeve 1D corresponds to the inner sleeve described above, and the sleeve collar 1E corresponds to the outer sleeve. In this example, the communication paths 1C are vertical grooves, and molded using a die (not shown). A shape of the communication paths 1C in plan does not have to be an arc shape. Instead, it may be a D-cut shape provided at one or more positions on the outer circumference. Moreover, the communication paths 1C do not have to be parallel to the rotary shaft 2. Further, in FIG. 3, the gap between the hub 7 and the sintered sleeve 1D (S2$b$) has a width about the same as that of the second gap (S2$a$) defined by the hub 7 and the sleeve collar 1E. However, it is not necessary that they are the same.

The sintered sleeve 1D includes iron or copper as a main component with the sintered density of 90% or higher. Pores on the surfaces are sealed by providing a triiron tetroxide film or treating with electroless nickel plating. The thickness of the film or the plating has a thickness of 2 to 6 micrometers. By having the sintered density of 90% or higher, the leakage of hydrodynamic pressure from the bearing surface can be prevented. With the density not higher than this value, the hydrodynamic pressure leaks, and the stiffness of bearing cannot be achieved. By providing a triiron tetroxide film or treating the surface with electroless nickel plating, abrasion resistance property and antirust effect can be achieved. Thus, a hydrodynamic bearing rotary device 100 with high reliability which can be used for a long term can be achieved. Herein, the sintered density refers to a density obtained as follows. A density is calculated from the weight of the sintered body and a volume measured based on Archimedes' principle with pores on the surfaces of the sintered body being sealed with wax or the like. The density obtained in this way is divided by a true density of usual components of the sintered body. In this way, the sintered density is obtained.

With such a hydrodynamic bearing rotary device 100, similar effects as those of the hydrodynamic bearing rotary device 100 of the first embodiment can also be achieved.

Other Embodiments (A)

In the above embodiment, as shown in FIG. 1, the gap between the outer sleeve (sleeve cover) 1E and the hub 7 is formed into a tapered-seal shape with the maximum gap G2 to keep the lubricant within the gap. However, the present invention is not limited to such an example.

Figure 12:
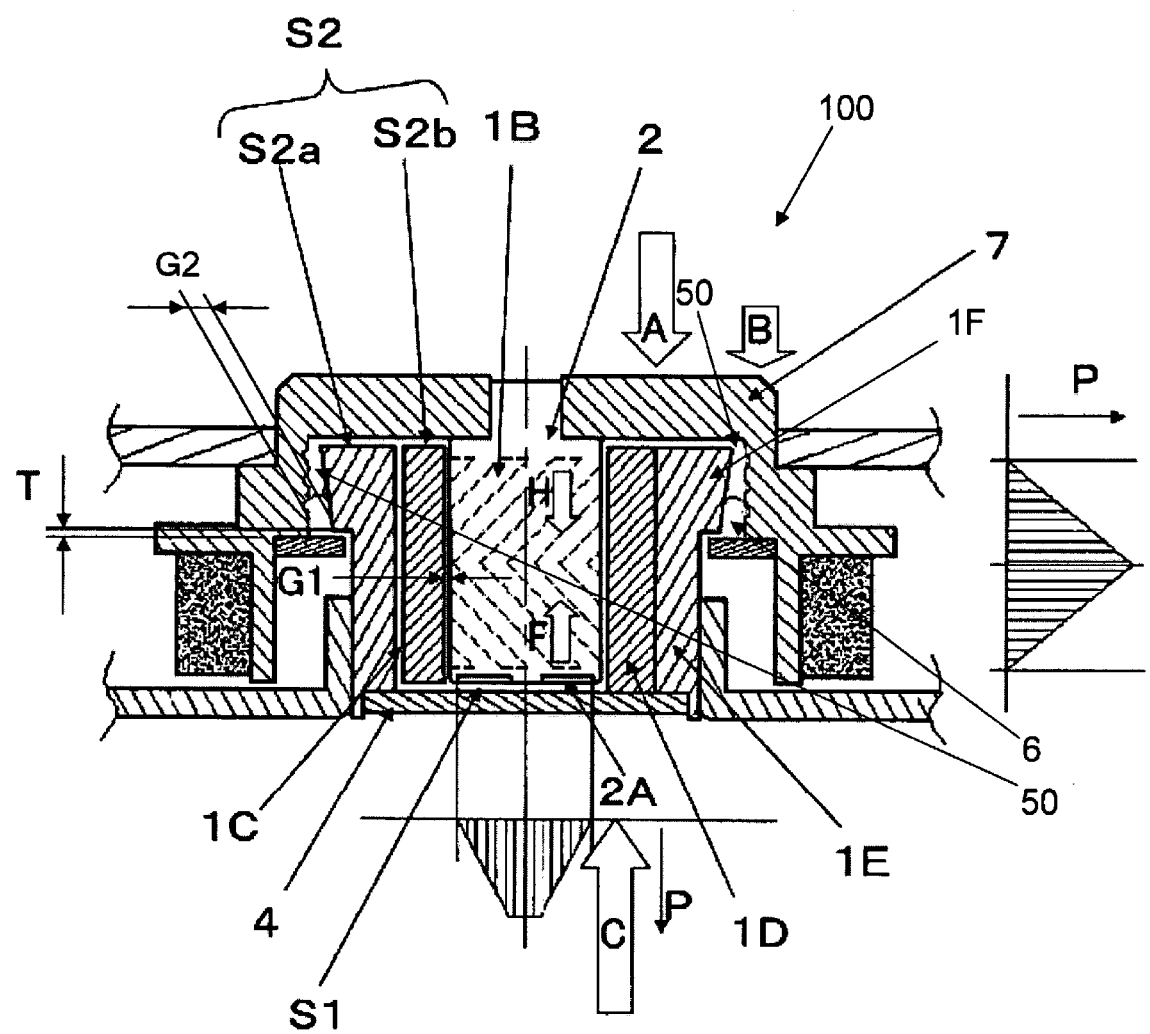
FIG. 12 shows a detailed enlarged cross-sectional view of a hydrodynamic bearing rotary device according to another embodiment of the present invention.

For example, as shown in FIG. 12, helical grooves 50 may be formed on the inner peripheral surface of the hub 7 or the outer peripheral surface of the flange 1F which defines the fourth gap 6 to keep the lubricant.

(B)

In the above embodiment, the hub and the like are formed of one component. However, the present invention is not limited to such an example.

Figure 13:
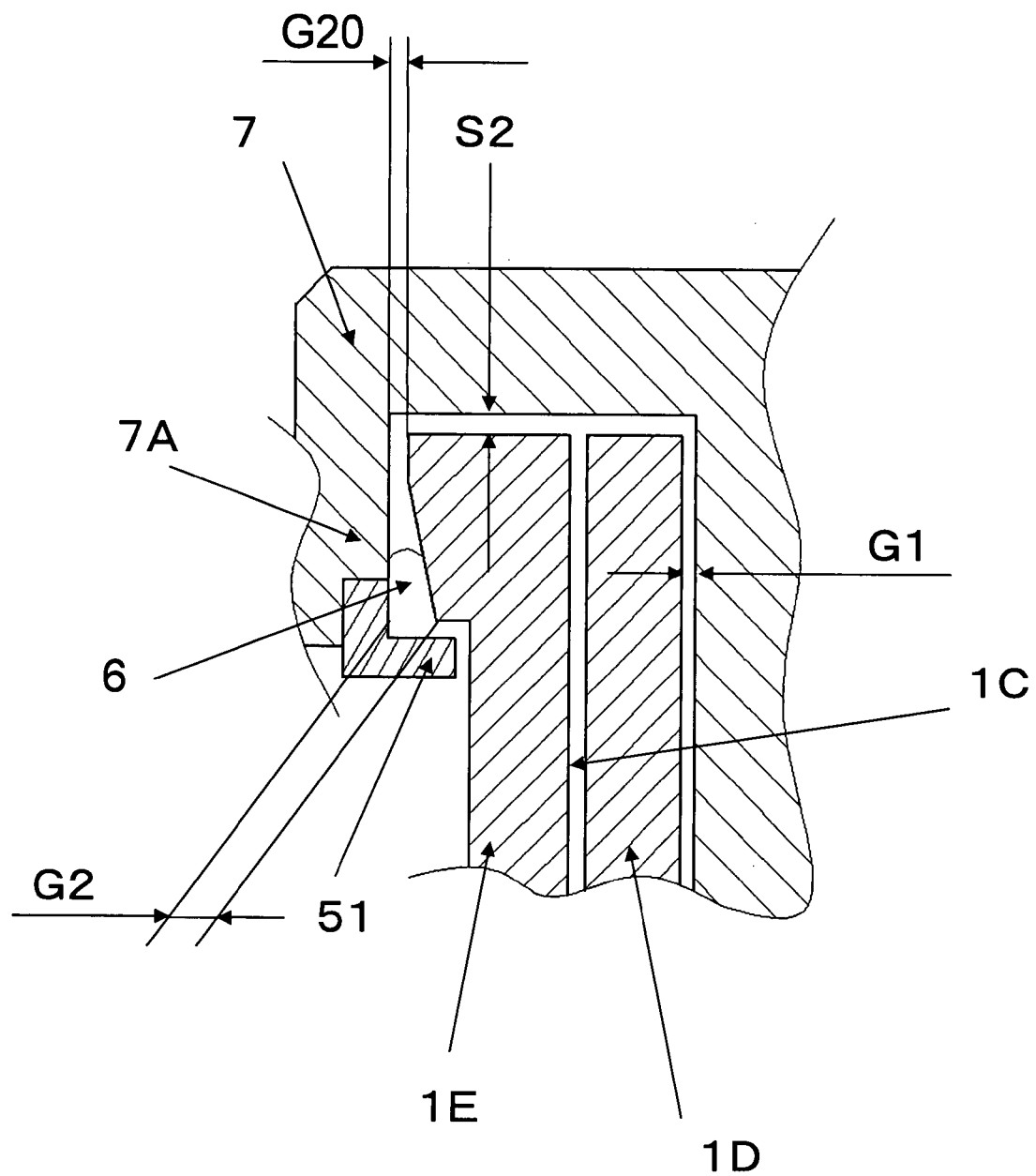
FIG. 13 is an enlarged view of a hydrodynamic bearing rotary device according to yet another embodiment of the present invention.

For example, as shown in FIG. 13, a seal ring 51 having a cross-section of L-lettered shape may be fixed to a lower end of a hub tubular portion 7A and integrated with the hub by press fitting, adhering, press-fit adhering, laser-welding, or the like after the lubricant 5 is injected. With such a structure, an opening of the bearing is wide when the lubricant 5 is injected so the lubricant 5 is less likely to be spilled and sticks outside the bearing while it is being injected. Further, by reducing the gap between the lower end of the seal ring 51 and the outer sleeve 1E in the axial direction, evaporation of the lubricant 5 can be suppressed and the life of the bearing under a high temperature can be extended. Further, when a large impact force is applied in a direction to disengage the rotor, the hub can support the impact loading together with the flange at the thrust bearing portion. Thus, it becomes possible for the device to withstand a larger shock.

The hub may be formed of a plurality of components having shapes other than those as described above. They do not impair the spirit of the present invention. Other parts can also be deformed without departing from the scope of the present invention.

(C)

In the above embodiment, the thrust plate 4 is fixed to the sleeve 1. However, the present invention is not limited to such an example.

For example, the thrust plate may be fixed to the base plate.

(D)

In the above embodiment, the sleeve 1 is formed of two members, i.e., the inner sleeve 1D and the outer sleeve 1E. However, the present invention is not limited to such an example.

For example, the sleeve may be formed of one component formed by machining a rod member of copper alloy or stainless alloy by a lathing process, and may have a communication path provided by drilling.

(E)

In the above embodiment, the rotor magnet 9 is directly fixed to the hub 7. However, the present invention is not limited to such an example.

For example, a main body of the hub may be formed of a non-magnetic material, and then, a circular back yoke made of a magnetic material may be fixed to the hub. A rotor magnet may be fixed to the back yoke.

(F)

In the above embodiment, the additional member to the motor is a magnetic disc. However, the present invention is not limited to such an example.

The additional member may be, for example, magnetic discs such as HDDs and FDDs or optical discs such as CD-ROMs, DVDs, MOs and the like, polygon mirrors used for laser scanner/printers or the like, rotary heads used for rotary head devices such as VCRs and the like.

According to the present invention, the rotation property is increased to suppress the friction torque and to reduce the power consumption of the motor. Therefore, the present invention can be widely used as the hydrodynamic bearing rotary device incorporated not only in recording and reproducing apparatuses such as hard disc drives, optical disc drives, video cassette recorders and the like, but also in information equipment such as laser scanner, laser printers and the like.

The invention claimed is:

1. A hydrodynamic bearing rotary device, comprising:
    a sleeve having a tubular shape and an end surface, and extending in an axial direction;
    a rotary shaft having a first surface extending in a direction orthogonal to the axial direction of the sleeve, the rotary shaft being fitted to the sleeve and supported so as to be rotatable with respect to the sleeve;
    a thrust plate disposed at a position opposing the first surface; and
    a hub fitted to the rotary shaft at a position remote from the first surface and having a side along the axial direction and an additional member receiving surface configured to have an additional member to a motor loaded thereon, wherein,
    a first gap into which a lubricant is injected is formed between the first surface and the thrust plate,
    a second gap into which the lubricant is injected is formed between the hub and the end surface of the sleeve on the side of the hub along the axial direction, and
    a width of the second gap is greater than a width of the first gap when the first gap has a predetermined gap size and the second gap is at a minimum gap size.

2. The hydrodynamic bearing rotary device according to claim 1, wherein:
    a third gap into which the lubricant is injected is formed between an inner peripheral surface of the sleeve and the rotary shaft;
    a fourth gap into which the lubricant is injected is formed between an outer peripheral surface of the sleeve on a side adjacent the hub and an inner peripheral surface of the hub which opposes the outer peripheral surface; and
    a width of the third gap is less than the width of the second gap, and the width of the second gap is less than a width of the fourth gap when the third gap has a predetermined gap size and the fourth gap is at a maximum gap size.

3. The hydrodynamic bearing rotary device according to claim 2, wherein, on the outer peripheral surface of the sleeve between lateral two surfaces of the sleeve which define the fourth gap, the outer peripheral surface is formed such that the width of the fourth gap becomes narrower toward the second gap.

4. The hydrodynamic bearing type rotary device according to claim 3, wherein a minimum gap size of the fourth gap is greater than the minimum gap size of the second gap.

5. The hydrodynamic bearing rotary device according to claim 1, wherein:
    the sleeve has a flange portion protruding in a direction orthogonal to an axial direction adjacent the hub on a surface opposing the hub, and
    the hub has a stopper ring configured to be hooked to the flange portion.

6. The hydrodynamic bearing rotary device according to claim 1, further comprising a base plate for fixing the sleeve, wherein:
    the hub includes a rotor magnet; and
    the rotor magnet generates a magnetic attraction force in a direction toward the base plate.

7. The hydrodynamic bearing rotary device according to claim 1, wherein the sleeve includes a sintered sleeve formed of metal sintered material, and a sleeve collar surrounding the outer circumference of the sintered sleeve, and
    the communication path which connects the first gap and the second gap is formed between the sintered sleeve and the sleeve collar.

8. The hydrodynamic bearing rotary device according to claim 7, wherein the sintered sleeve includes iron or copper as a main component at a sintered density of 90% or higher, and a surface thereof is provided with a triiron tetroxide film or treated with electroless nickel plating.

9. The hydrodynamic bearing rotary device according to claim 1, wherein the additional member is at least one of a magnetic disc, an optical disc, a polygon mirror, and a rotary head.

10. An information apparatus, comprising:
    the hydrodynamic bearing rotary device according to claim 1; and
    a head portion which inputs and outputs data to and from a disc for recording data which is to be fitted to the hub and formed into a disc-like shape.

11. A hydrodynamic bearing rotary device, comprising:
    a sleeve having a bearing hole, an inner peripheral surface, an outer peripheral surface, and an end surface;
    a rotary shaft having an outer peripheral surface, a first end and a second end, and being inserted into the bearing hole of the sleeve so as to be rotatable;
    a hub attached to the first end of the rotary shaft and having a disc receiving surface configured to have a disc loaded thereon, and having an inner peripheral surface;
    a thrust plate disposed so as to oppose an end surface of the second end of the rotary shaft;
    a first gap having a predetermined width;
    a second gap disposed between the hub and the end surface of the sleeve, and having a predetermined width of a minimum gap;
    a thrust bearing portion provided in the first gap, the thrust bearing portion including thrust hydrodynamic grooves formed on at least one of the thrust plate and the end surface of the second end of the rotary shaft;
    a radial bearing portion formed in a third gap, the third gap having a predetermined width, the radial bearing portion including radial hydrodynamic grooves formed on at least one of the outer peripheral surface of the rotary shaft and the inner peripheral surface of the sleeve;
    a communication path connecting the first gap and the second gap;
    a fourth gap having a predetermined width of a maximum gap and being disposed between the outer peripheral surface of the sleeve on a side adjacent the hub and the inner peripheral surface of the hub, the inner peripheral surface of the hub having a diameter larger than that of the outer peripheral surface of the sleeve; and
    a lubricant injected into the communication path, the first gap, the second gap, the third gap, and the fourth gap,
    wherein the predetermined width of the minimum gap of the second gap is greater than the predetermined width of the first gap, and the predetermined width of the maximum gap of the fourth gap is greater than the predetermined width of the second gap, which is greater than the predetermined width of the third gap.

12. The hydrodynamic bearing type rotary device according to claim 11, wherein a minimum gap size of the fourth gap is greater than the minimum gap size of the second gap.

13. A hydrodynamic bearing rotary device, comprising:
a sleeve having a bearing hole, an inner peripheral surface, an outer peripheral surface, and an end surface,
a flangeless rotary shaft which is inserted into the bearing hole of the sleeve so as to be relatively rotatable, the rotary shaft having an outer peripheral surface, a first end and a second end;
a hub attached to the first end of the rotary shaft and having an inner peripheral surface and an additional member receiving surface configured to have an additional member to a motor loaded thereon;
a thrust plate which is fixed so as to oppose the second end of the rotary shaft;
a first gap between an end surface of the second end of the rotary shaft and the thrust plate, into which a lubricant is injected;
a second gap between a surface of the hub and the end surface of the sleeve on a side of the first end of the rotary shaft, the surface of the hub and the end surface of the sleeve opposing one another;
a third gap with radial hydrodynamic grooves formed on at least one of the outer peripheral surface of the rotary shaft and the inner peripheral surface of the sleeve; and
a fourth gap configured to have a predetermined maximum gap size and being disposed between the outer peripheral surface of the sleeve on a side of the end surface of the sleeve and the inner peripheral surface of the hub, the inner peripheral surface of the hub having a diameter larger than that of the outer peripheral surface of the sleeve,
wherein when the second gap has a predetermined minimum gap size, the third gap has a predetermined gap size and the fourth gap has the maximum gap size, the maximum gap size of the fourth gap is greater than a predetermined minimum gap size of the second gap, which is greater than the predetermined gap size of the third gap,
a communication path connecting the first gap and the second gap is formed on the sleeve, and
the sleeve includes iron or copper as a main component at a sintered density of 90% or greater, and a surface thereof is sealed with a triiron tetroxide film or electroless nickel plating having a thickness of 2 to 6 µm.

14. The hydrodynamic bearing rotary device according to claim 13, wherein:
the sleeve has a flange portion protruding in a direction orthogonal to an axial direction adjacent the hub on a surface opposing the hub, and
the hub has a stopper ring configured to be hooked to the flange portion.

15. The hydrodynamic bearing rotary device according to claim 13, wherein, on the outer peripheral surface of the sleeve between two lateral surfaces of the sleeve which define the fourth gap, the outer peripheral surface is formed such that the gap size of the fourth gap becomes narrower toward the second gap.

16. The hydrodynamic bearing type rotary device according to claim 15, wherein a minimum gap size of the fourth gap is greater than the minimum gap size of the second gap.

17. The hydrodynamic bearing rotary device according to claim 13, further comprising a base plate for fixing the sleeve, wherein:
the hub includes a rotor magnet; and
the rotor magnet generates a magnetic attraction force in a direction toward the base plate.

18. The hydrodynamic bearing rotary device according to claim 13, wherein the sleeve includes a sintered sleeve formed of metal sintered material, and a sleeve collar surrounding the outer circumference of the sintered sleeve, and
the communication path is formed between the sintered sleeve and the sleeve collar.

19. The hydrodynamic bearing rotary device according to claim 13, wherein the additional member is at least one of a magnetic disc, an optical disc, a polygon mirror, and a rotary head.

20. An information apparatus, comprising:
The hydrodynamic bearing rotary device according to claim 13; and
a head portion which inputs and outputs data to and from a disc for recording data which is to be fitted to the rotary shaft and formed into a disc-like shape.

* * * * *